United States Patent [19]

Hager

[11] 4,200,195
[45] Apr. 29, 1980

[54] STOCK RACK WITH PIVOTED TRAYS

[75] Inventor: Clarence H. Hager, Rockford, Ill.

[73] Assignee: Modern Suspension Systems, Inc., Rockford, Ill.

[21] Appl. No.: 970,571

[22] Filed: Dec. 18, 1978

[51] Int. Cl.² ............................................. A47F 5/00
[52] U.S. Cl. .................................... 211/24; 108/111; 211/150
[58] Field of Search .................... 108/6, 99, 100, 111, 108/134; 211/23, 24, 150, 169.1, 170

[56] References Cited

U.S. PATENT DOCUMENTS

| | | | |
|---|---|---|---|
| 2,922,683 | 1/1960 | Schmertz | 108/134 X |
| 3,680,710 | 8/1972 | Hager | 211/24 |
| 3,762,572 | 10/1973 | Hager | 211/24 |
| 3,905,310 | 9/1975 | Hager | 108/111 |

*Primary Examiner*—James C. Mitchell
*Attorney, Agent, or Firm*—Morsbach & Pillote

[57] ABSTRACT

A stock rack of the type used in tire plants for transporting tread forming blanks and wherein a plurality of trays are supported on end upright supports and one or more intermediate upright supports for swinging movement between a generally horizontal position and a raised position. Each tray has a plurality of axially aligned rolled rim sections along its rear edge, the rolled rim sections being dimensioned to extend between adjacent ones of the upright supports and having adjacent ends spaced apart to receive an intermediate upright support therebetween. The upright supports have hinge rod receiving openings at vertically spaced locations therealong and hinge rods extend through horizontally aligned ones of the hinge rod receiving openings in the upright end and intermediate supports and through the rolled rim sections on a respective one of the trays. The hinge rod is secured against turning movement relative to the upright supports and the rolled rim sections on the tray have an internal cross-section sufficiently larger than the hinge rod to loosely receive the hinge rod so that the rolled rim sections on the rear edge of each tray turn on the hinge rod as the trays are moved between their lowered and raised positions.

4 Claims, 8 Drawing Figures

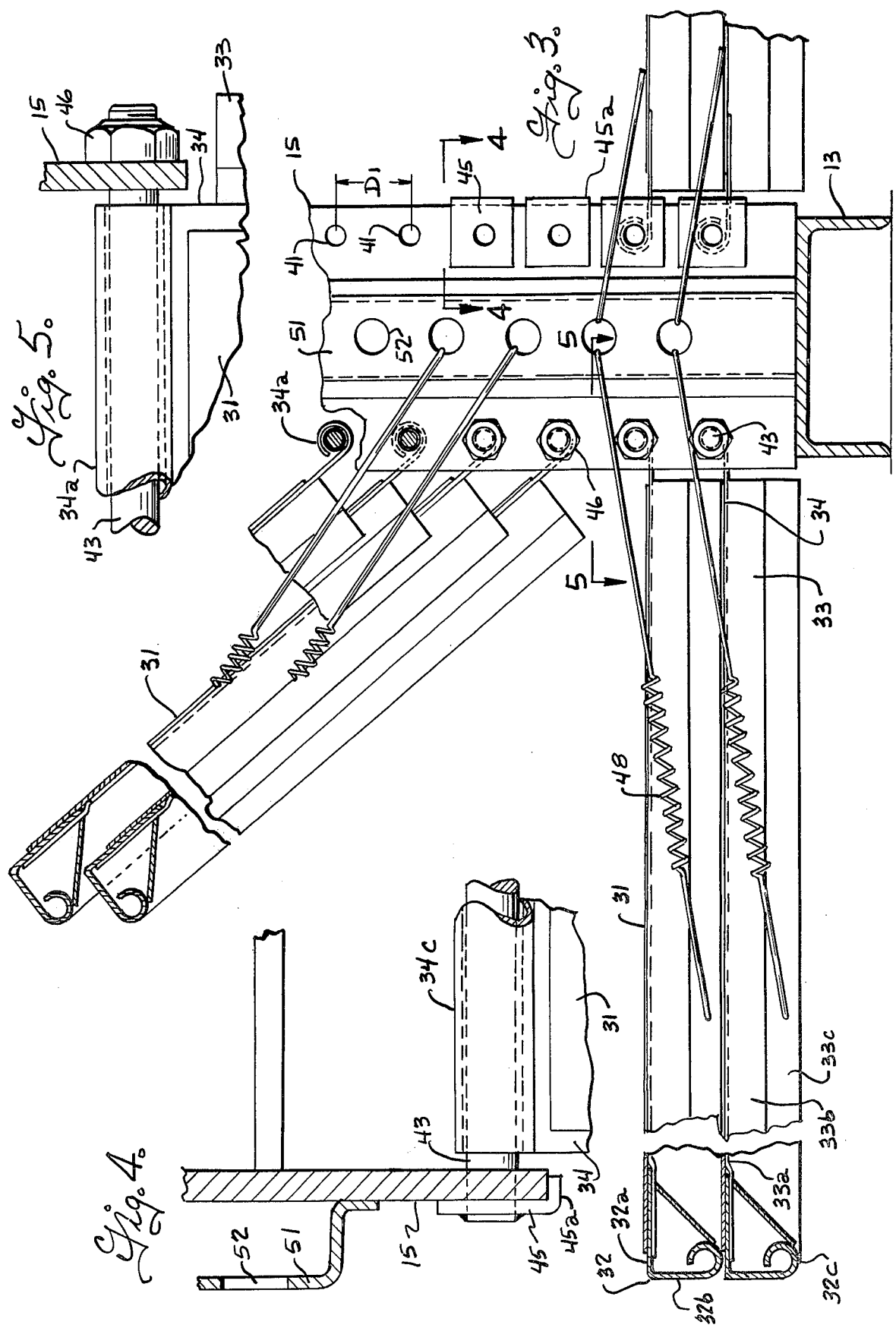

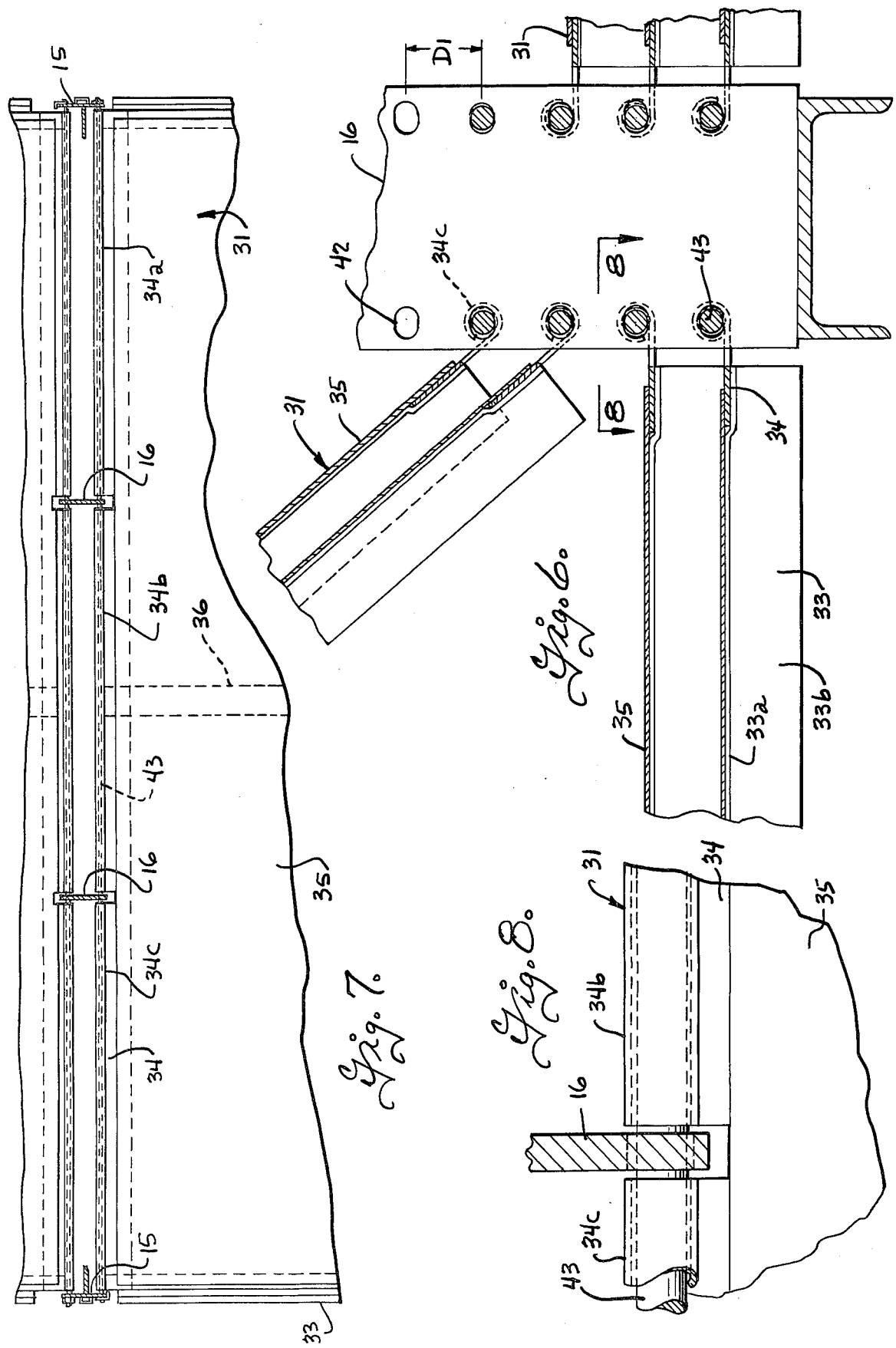

STOCK RACK WITH PIVOTED TRAYS

BACKGROUND OF THE INVENTION

It is presently common practice in automoblie tire plants to transport tread forming blanks on wheeled stock racks to the point where the treads are assembled on the tire carcass. The wheeled stock racks include a plurality of trays supported on upright supports for swinging movement between a generally horizontal position and a raised position. The tire treads are carried on the top of the trays and the trays have a depth sufficient to accommodate the tire tread on the subjacent tray. As treads are removed from the top of a tray, the tray is swung to a raised position to allow access to the tread forming blank on the subjacent tray. The trays must be quite long to accommodate the length of the tire tread forming blanks and, in order to maximize the number of trays in each stock rack, it is desirable to make the trays as shallow as possible consistent with providing clearance for the tread forming blank on a subjacent tray and also providing adequate strength in rigidity to prevent excessive distortion or even buckling of the tray in use.

In the applicants prior U.S. Pat. Nos. 3,680,710; 3,762,572 and 3,905,310, assigned to the assignee of the present invention, there are disclosed stock rack constructions in which the trays have a rolled rim along the rear edge of the tray to stiffen the tray and avoid sharp edges which could cause injury to the user. In the tire tray rack disclosed in the aforementioned U.S. Pat. Nos. 3,680,710 and 3,762,572, the trays were hingedly supported only at the ends of the trays by hinge pins that rotatably extended through openings in the end upright supports and non-rotatably fit in the ends of the rolled rim on the rear edge of the tray. The end upright supports provided only a narrow bearing area and the hinge pins on the trays which turned in the openings in the supports tended to wear rapidly. Moreover, because of the relatively long length of the trays required for the tire treads, there is some tendency for the trays to sag and distort due to the weight of the tire treads when the trays are supported only at their ends.

In the applicant's prior U.S. Pat. No. 3,904,310 there is disclosed a tire rack construction in which a rolled rim on the rear edge of the tray was directly supported in semi-circular recesses formed in end upright supports and in one or more intermediate upright supports. This construction swingably supported the rear edges of the trays not only at the rear ends but also at one or more intermediate locations to inhibit longitudinal buckling or distortion of the trays due to the weight of the tire treads. However, the construction shown in U.S. Pat. No. 3,905,310 required the use of open-sided recesses in the upright supports and rolled rim of the tire tray would sometimes become dislodged from the recess in the supports, particularly if the tire tray was warped or bent. In addition, the upright supports provided only a narrow bearing area which tended to concentrate the wear on the rolled rim of the tray and it was necessary to provide bearing inserts on the upright supports to reduce wear on the rolled rim of the trays.

SUMMARY OF THE INVENTION

It is the general object of the present invention to overcome the disadvantages of the prior stock racks for tire treads by providing a stock rack which supports the rear edge of the trays on end upright supports and also on one or more intermediate upright supports to inhibit longitudinal buckling or distortion of the elongated tray during use; which prevents dislodgment of the trays from the upright supports during swinging movement between their lowered and raised positions, and which distributes the hinge wear more uniformly along the length of the rolled rim on the rear edge of the trays.

Accordingly, the present invention provides a stock rack of the type having a pair of end upright supports and at least one intermediate upright support, and a plurality of superposed trays each mounted on the upright supports for swinging movement about a horizontal axis adjacent a rear edge of the tray from a generally horizontal position to a raised position, and wherein the trays each have at least two axially aligned rolled rim sections of substantially circular cross-section extending along the rear edge of the tray with the rolled rim sections dimensioned to extend between adjacent ones of the upright supports and having their adjacent ends spaced apart to receive an intermediate one of the upright supports therebetween, the end upright supports and the intermediate upright supports each having a plurality of vertically spaced hinged rod receiving openings therein with respective ones of the openings in the end and intermediate upright supports arranged in horizontally aligned sets, and a plurality of hinge rods each having a length to extend from one end support to the other end support and each extending through a respective one of the horizontally aligned sets of hinge rod receiving openings in the end and intermediate upright supports and through the axially aligned rolled rim sections of the rear edge of a respective one of the trays, the hinge rods being secured against turning relative to the upright supports, and the rolled rim sections having a cross-section sufficiently larger than the hinge rod to loosely receive the hinge rod so that the rolled rim section turn on the rod as the trays are moved between their lowered and raised positions.

These, together with other features and advantages of the present invention will become apparent as the invention becomes better understood from the following detailed description when taken in connection with the accompanying drawings wherein:

FIG. 3 is a fragmentary vertical sectional view taken on the plane 3—3 of FIG. 2 and illustrating the stock rack on a larger scale than FIG. 2;

FIG. 4 is a fragmentary horizontal sectional view taken on the plane 4—4 of FIG. 3 and illustrating the parts on a larger scale than FIG. 3;

FIG. 5 is a fragmentary horizontal sectional view taken on the plane 5—5 of FIG. 3 and illustrating the parts on a larger scale than FIG. 3;

FIG. 6 is a fragmentary vertical sectional view taken on the plane 6—6 of FIG. 2 and illustrating the stock rack on a larger scale than FIG. 2 with some of the trays in a lower position and some of the trays in a raised position;

FIG. 7 is a fragmentary horizontal sectional view taken on the plane 7—7 of FIG. 1; and FIG. 8 is a fragmentary horizontal sectional view taken on the plane 8—8 of FIG. 6 and illustrating the parts on a larger scale than FIG. 6.

Figure 1:
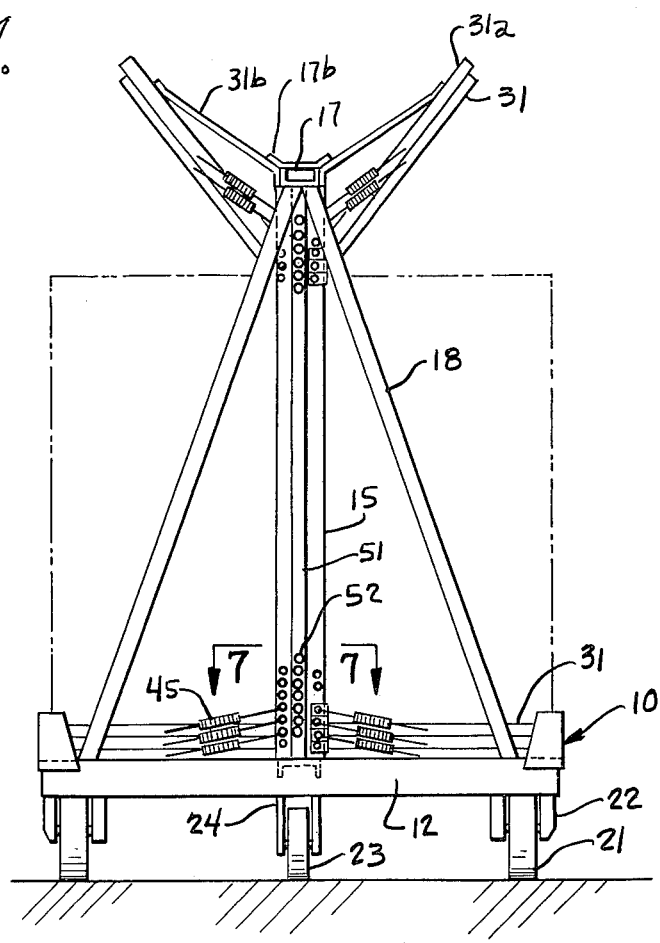
FIG. 1 is an end elevational view of a wheeled stock rack embodying the present invention and showing some of the trays in their lower position and some of the trays in a raised position.
Figure 2:
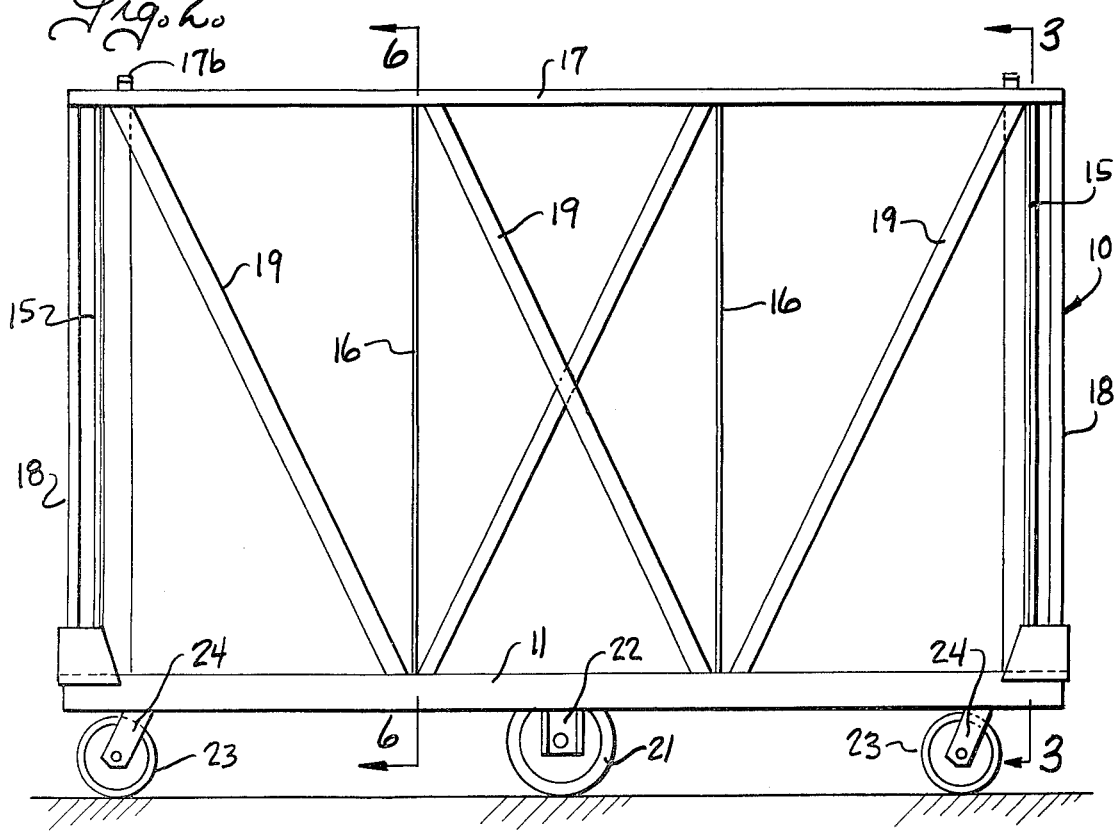
FIG. 2 is a side elevational view of the wheeled stock rack with the trays removed to illustrate the frame construction.

The stock rack of the present invention for supporting tire tread forming blanks is advantageously incorporated in a mobile truck 10 to enable transporting of the tire tread forming blanks to the station where the treads are assembled on the tire carcass. In general, the truck includes a rigid frame having spaced side and end members 11 and 12 respectively conveniently of channel-shape cross-section, and rigidly interconnected at the corners of the frame. An intermediate frame member 13, also conveniently of channel-shaped cross-section, extends between the end members 12 and generally parallel to the side members 11. End upright supports 15 are mounted on the intermediate frame member 13 adjacent opposite ends of the truck and one or more intermediate upright support member 16, herein shown two in number, are also mounted on the intermediate frame member 13 at locations intermediate the ends of the truck. The upper ends of the end and intermediate upright supports 15 and 16 are each connected by a header 17 which is braced against movement crosswise of the mobile truck by end braces 18. The upright support members are also braced against movement in a direction lengthwise of the truck by intermediate brace members 19 that extend generally diagonally between the upper ends of the upright supports and the intermediate frame member 13. As shown in FIGS. 1 and 2 the mobile truck is supported by wheels arranged in any suitable configuration. In the specific embodiment shown, a pair of intermediate wheels 21 are rigidly supported by brackets 22 in the side frame members 11 and a pair of caster wheels 23 are swivelly supported by caster brackets 24 on the intermediate frame member 13 adjacent opposite ends of the truck. Other wheel configurations can be utilized, if desired.

The stock rack includes a plurality of elongated trays 31 for receiving and supporting tire tread forming blanks. The trays are mounted on the end and intermediate upright supports 15 and 16 for movement between a generally horizontal position and a raised position. Some trucks are formed with a single set of trays which are mounted at only one side of the upright supports 15 and 16. However, in the preferred embodiment illustrated, two sets of trays are provided, one at each side of the truck, and the trays are supported at relatively opposite sides of the upright end and intermediate supports 15 and 16. The uppermost tray 31a (FIG. 1) is advantageously provided with brackets 31b arranged to engage stops 17b on the top rail to limit upward swinging movement of the tray, as shown in FIG. 1.

The trays 31 are similarly constructed and may, for example, be constructed in a manner more fully disclosed in U.S. Pat. No. 3,762,572, to which reference is made for a more complete disclosure. As shown, each tray includes a front frame member 32, side frame members 33 and a rear frame member 34 extending between the rear ends of the side frame members. The front frame members 32 can be formed with a generally L-shaped cross-section including a generally horizontal upper leg 32a, a generally vertical front leg 32b and a rolled rim 32c at the lower edge to rigidify the front frame and to also avoid exposure of sharp edges. Side members 33 as illustrated herein have a generally L-shaped cross-section, it being understood that the side members and front members could be formed with a generally box-shaped cross-section if desired. As shown, side members have a generally horizontal upper leg 33a which is secured as by rivets or welded to the horizontal leg 32a of the front frame member, and a downwardly extending leg 33b that terminates at its lower edge in a preferably rolled rim 33c. The rear frame members 34 of the trays are generally flat and are secured, as by rivets or welding, to the upper legs 33a of the side frame members 33 adjacent the rear ends of the latter. In accordance with the present invention the rear frame members 34 are formed with a plurality of axially aligned rolled rim sections, herein shown three in number and designated 34a, 34b and 34c. The rolled rim sections 34a-34c have a circular cross-section and a length to extend between adjacent ones of the upright supports 15, 16 and with their adjacent ends spaced apart as best shown in FIG. 7 to receive the intermediate upright supports 16 therebetween. The axially aligned rolled rim sections on the rear frame member can conveniently be formed by notching a strip of flat stock and then forming the rolled rim sections on the strip of flat stock. The rolled rim sections 34a-34c are preferably disposed above the plane of the top of the tray. A flat tray top 35, preferably of a non-corrosive material such as sheet aluminum or the like, is attached as by riveting to the top flanges on the front, side and rear frame members to provide a support surface for the tire tread forming blank. One or more shallow intermediate supports 36 (FIG. 7) can be provided to extend between the front and rear frame members intermediate the ends of the tray to underlie and support the top 35, if desired.

As best shown in FIG. 3, the depending flanges on the front frame members of each tray engage the top of the subjacent tray when the latter are in a generally horizontal position and space the trays apart a distance sufficient to accomodate a tire tread forming blank on the subjacent tray. The trays are swingable to a raised position to allow removal of a tread forming blank on the top of a subjacent tray. The side flanges 33b on the side frame members of each tray diverge outwardly so as to allow partial nesting of the trays when the latter are in the raised position as shown in the upper portion of FIGS. 3 and 6.

The tire trays 31 for the tire tread forming blanks are relatively long to accommodate the length of the blank and sometimes tend to sag or distort under the weight of the tire tread forming blanks. The present invention provides an improved arrangement for supporting the elongated tire trays adjacent their ends and also at locations intermediate their ends on the end upright supports and intermediate upright supports. As best shown in FIGS. 1 and 3, the end upright supports 15 are provided with a row of openings 41 inwardly from each edge of the end upright support and which are vertically spaced apart on a center-to-center distance D1 (FIG. 3) approximating the spacing of the trays when they are in their horizontal position as shown in FIG. 3. The intermediate upright supports 16 are also provided with rows of openings 42 inwardly from their edges and having the same vertical center-to-center spacing D1. The openings 41 and 42 in the end and intermediate upright supports are arranged in horizontally aligned sets so that hinge rods 43 can be inserted through aligned ones of the openings in the end and intermediate supports and through the axially aligned rolled rim sections 34a-34c on the rear edge of the respective tray to swingably support the trays on the upright supports. The hinge rods 43 are secured against axial and rotary movement relative to the upright supports. As best shown in FIGS. 3 and 4 a head 45 is secured as by welding or the like to one end of each of the hinge rods 43 to engage a side of one of the upright supports, and a flange 45a is provided on the head and arranged to engage one edge of the end upright support to hold the hinge rod against turning movement relative to the upright support. A means such as a nut 46 is secured as by threading on the other end of each of the rods and arranged to engage the outside of the other end upright support, as best shown in FIG. 5. The openings 41 in the end upright supports are dimensioned to receive the rods with a sliding fit. For example, with a hinge rod of 7/16" diameter, the openings 41 are preferably formed with a 15/32" diameter. However, in order to accomodate minor misalignment between the openings 41 and 42 in the end and intermediate supports and to also accommodate some distortion and/or warpage of the tray, the intermediate openings 42 are preferably formed so as to be horizontally elongated as best shown in FIG. 6. For example, with the 7/16" hinge rod, the openings 42 have a vertical size of about 15/32" to slidably receive the rods but are horizontally elongated by about ⅛" to provide an overall horizontal width of about 19/32". The intermediate supports 16 are preferably assembled on the intermediate frame member 13 so that the center of the openings 42 is in the same vertical and horizontal plane as the center of the openings 41 in the end members. However, the elongated openings will accomodate some misalignment in the end and intermediate supports and will also accommodate some warpage and distortion in the trays.

Tension springs are provided for yield supporting the trays in a raised position and, as described in the aforementioned U.S. Pat. Nos. 3,680,710 and 3,762,572, the tension springs 48 are attached at one end to each of the trays and at the other end to a respective one of the end supports 15 at a location somewhat above the pivot axis of the tray to apply a lifting force to the tray for holding the trays in a raised position. As best shown in FIGS. 3 and 4, the end upright supports 15 have channel-shaped members 51 secured thereto as by welding and openings 52 are formed in the channel at locations spaced apart therealong on a center-to-center distance approximating the distance Dl, but at locations such that the openings 52 are each spaced above a respective one of the openings 41 in the end upright support. Springs 48 have hooks at one end which extend into the openings 52 in the end supports and hooks at the other end which are either attached directly to the trays or to adjustable brackets on the side edges of the trays as more fully disclosed in U.S. Pat. No. 3,762,572.

From the foregoing it is thought that the construction and operation of the stock rack with pivoted trays will be readily understood. The tire trays are formed with a plurality of axially aligned rim sections along their rear edge, and the end and intermediate upright supports are formed with openings inwardly of their edges which receive hinge rods that extend through the aligned openings 41 and 42 in the end and intermediate support members and through the axially aligned rolled rim sections 34a-34c on the rear edges of the trays, to swingably support the trays on the end and intermediate support members. In this manner, the trays are swingably supported at their ends and also intermediate their ends to inhibit longitudinal sagging or buckling of the trays while a load is applied. The continuous hinge rod aids in stiffening and reinforcing the rear end of the tray and holds the tray in the openings 41 and 42 in the end and intermediate support members so the tray cannot be laterally dislodged from the end and intermediate upright supports during swinging movement of the tray between its lowered and raised positions. Further, the hinge rod is held against rotation relative to the end and intermediate supports so that it does not wear in the area of the upright supports, and the rolled rim on the trays is dimensioned to loosely receive the hinge rods so that the rolled rim turns relative to the rod during swinging of the tray between its lowered and raised positions. This distributes the wear along the rolled rim sections on the rear edge of the trays.

The embodiments of the invention in which an exclusive property or privilege is claimed are defined as follows:

1. In a stock rack with pivoted trays of the type used in tire plants for transporting tire tread forming blanks, the stock rack having a pair of end upright supports and at least one intermediate upright support, and a plurality of superposed trays each mounted on the upright supports for pivotal movement about a horizontal axis adjacent a rear edge of the tray from a lowered position to a raised position, the improvement wherein each tray has at least two axially aligned rolled rim sections of substantially circular cross-section extending along the rear edge of the tray, said rolled rim sections being dimensioned to extend between adjacent ones of said upright supports and having adjacent ends spaced apart a distance to receive an intermediate one of upright supports therebetween, said end upright supports and said intermediate upright support each having a plurality of vertically spaced hinge rod receiving openings therein with respective ones of the openings in the end and intermediate upright supports being arranged in horizontally aligned sets, a plurality of hinge rods each having a length to extend from one end support to the other end support and each extending through a respective one of the horizontally aligned sets of hinge rod receiving openings in the end and intermediate upright supports and through the axially aligned rim sections on the rear edge of a respective one of the trays, means securing the hinge rods against turning relative to upright supports, the rolled rim sections on the tray having an internal cross-section sufficiently larger than the hinge rod to loosely receive the hinge rod whereby the rolled rim sections on the rear edge of each tray turn on the hinge rod as the trays are moved between their lowered and raised positions.

2. A stock rack with pivoted trays according to claim 1 wherein the hinge rod receiving openings in the intermediate upright support are horizontally elongated in a direction crosswise of the hinge rod to support the hinge rod in a vertical direction while allowing limited shifting of the hinge rod in a horizontal direction relative to the intermediate support.

3. A stock rack with pivoted trays according to claim 2 wherein said hinge rods have a head on one end, and means on the head engageable with one of the end upright supports for locking the hinge rod against turning relative to the upright supports, said hinge rods having a nut threaded on the other end and engageable with the other of the end upright supports.

4. A stock rack with pivoted trays according to claim 1 wherein said hinge rods have a head on one end, and means on the head engageable with one of the end upright supports for locking the hinge rod against turning relative to the upright supports, said hinge rods having a nut threaded on the other end and engageable with the other of the end upright supports.

* * * * *